(12) United States Patent
O'Connor

(10) Patent No.: US 7,729,923 B2
(45) Date of Patent: Jun. 1, 2010

(54) VOICE RECOGNITION AND APPARATUS USING MODEL NUMBER LOOKUP

(75) Inventor: Dean O'Connor, Redmond, WA (US)

(73) Assignee: Nintendo of America, Inc., Redmond, WA (US)

( * ) Notice: Subject to any disclaimer, the term of this patent is extended or adjusted under 35 U.S.C. 154(b) by 796 days.

(21) Appl. No.: 10/398,556

(22) PCT Filed: Oct. 10, 2001

(86) PCT No.: PCT/US01/31589

§ 371 (c)(1),
(2), (4) Date: Sep. 9, 2003

(87) PCT Pub. No.: WO02/31809

PCT Pub. Date: Apr. 18, 2002

(65) Prior Publication Data

US 2005/0100144 A1    May 12, 2005

Related U.S. Application Data

(60) Provisional application No. 60/238,452, filed on Oct. 10, 2000.

(51) Int. Cl.
G06Q 10/00    (2006.01)
G06Q 30/00    (2006.01)
(52) U.S. Cl. .................................. 705/1.1; 705/26
(58) Field of Classification Search ............ 705/1
See application file for complete search history.

(56) References Cited

U.S. PATENT DOCUMENTS

| 789,106 | A | 5/1905 | Seymour |
| 1,330,368 | A | 2/1920 | Boos |
| 1,393,489 | A | 10/1921 | Boos |
| 1,476,819 | A | 12/1923 | Hope |
| 4,312,037 | A | 1/1982 | Yamakita |

(Continued)

FOREIGN PATENT DOCUMENTS

| DE | 3 315 724 | 10/1984 |
| EP | 0 068 642 | 1/1983 |
| EP | 0 191 636 | 8/1986 |
| EP | 0 286 130 | 10/1988 |
| EP | 0 349 284 | 1/1990 |

(Continued)

OTHER PUBLICATIONS

Information Disclosure Statement filed in U.S. Appl. No. 09/509,021, on Oct. 26, 2001.

(Continued)

Primary Examiner—John W Hayes
Assistant Examiner—Tonya Joseph
(74) Attorney, Agent, or Firm—Nixon & Vanderhye P.C.

(57) ABSTRACT

A voice response system for use in obtaining return qualification information for a product using a non-unique product identifier, including: a dial-in voice system operable to prompt a caller for the non-unique product identifier, wherein the non-unique product identifies the product as a member of a defined product group; a product registration database including a plurality of different, non-unique product identifiers; a return policy storage that defines return policies for each of the non-unique product identifiers; and an arrangement that looks up a specific return policy for the non-unique product identified entered by the caller and provides information to the caller regarding return qualification for the product identified by the non-unique product identifier.

12 Claims, 7 Drawing Sheets

U.S. PATENT DOCUMENTS

| | | | |
|---|---|---|---|
| 4,414,467 A | 11/1983 | Gould et al. |
| 4,458,802 A | 7/1984 | Maciver et al. |
| 4,563,739 A | 1/1986 | Gerpheide et al. |
| 4,598,810 A | 7/1986 | Shore et al. |
| 4,668,150 A | 5/1987 | Blumberg |
| 4,734,005 A | 3/1988 | Blumberg |
| 4,750,119 A | 6/1988 | Cohen et al. |
| 4,789,054 A | 12/1988 | Shore et al. |
| 4,792,018 A | 12/1988 | Humble et al. |
| 4,803,348 A | 2/1989 | Lohrey et al. |
| 4,812,629 A | 3/1989 | O'Neil et al. |
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,372,386 A | 12/1994 | Mills |
| 5,375,240 A | 12/1994 | Grundy |
| 5,414,252 A | 5/1995 | Shinoda et al. |
| 5,416,306 A | 5/1995 | Imahata |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,671,279 A | 9/1997 | Elgamal |
| 5,712,989 A | 1/1998 | Johnson et al. |
| 5,721,832 A | 2/1998 | Westrope et al. |
| 5,737,726 A | 4/1998 | Cameron et al. |
| 5,745,036 A | 4/1998 | Clare |
| 5,799,285 A | 8/1998 | Klingman |
| 5,804,803 A | 9/1998 | Cragun et al. |
| 5,857,175 A | 1/1999 | Day et al. |
| 5,889,270 A | 3/1999 | Van Haagen et al. |
| 5,895,453 A | 4/1999 | Cook |
| 5,913,210 A | 6/1999 | Call |
| 5,918,213 A * | 6/1999 | Bernard et al. ............ 705/26 |
| 5,918,214 A | 6/1999 | Perkowski |
| 5,949,335 A | 9/1999 | Maynard |
| 5,950,173 A | 9/1999 | Perkowski |
| 5,966,450 A | 10/1999 | Hosford et al. |
| 5,968,110 A | 10/1999 | Westrope et al. |
| 5,978,774 A | 11/1999 | Rogers et al. |
| 5,984,508 A | 11/1999 | Hurley |
| 6,014,635 A | 1/2000 | Harris et al. |
| 6,016,480 A | 1/2000 | Houvener et al. |
| 6,018,719 A | 1/2000 | Rogers et al. |
| 6,025,780 A | 2/2000 | Bowers et al. |
| 6,029,139 A | 2/2000 | Cunningham et al. |
| 6,029,141 A | 2/2000 | Bezos et al. |
| 6,039,244 A | 3/2000 | Finsterwald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,085,172 A * | 7/2000 | Junger ............ 705/28 |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,131,088 A | 10/2000 | Hill |
| 6,134,533 A | 10/2000 | Shell |
| 6,148,249 A | 11/2000 | Newman |
| 6,154,738 A | 11/2000 | Call |
| 6,219,652 B1 | 4/2001 | Carter et al. |
| 6,222,914 B1 | 4/2001 | McMullin |
| 6,269,344 B1 | 7/2001 | Junger |
| 6,317,028 B1 | 11/2001 | Valiulis |
| 6,463,421 B2 | 10/2002 | Junger |
| 6,542,933 B1 | 4/2003 | Durst et al. |
| 6,550,685 B1 | 4/2003 | Kindberg |
| 6,554,187 B2 | 4/2003 | Otto |
| 6,697,812 B1 | 2/2004 | Martin |
| 6,757,663 B1 | 6/2004 | Rogers et al. |
| 7,118,032 B2 | 10/2006 | Fayter et al. |
| 2002/0032612 A1* | 3/2002 | Williams et al. ............ 705/26 |
| 2002/0116274 A1 | 8/2002 | Hind et al. |
| 2003/0094494 A1 | 5/2003 | Blanford et al. |
| 2003/0126034 A1 | 7/2003 | Cheney et al. |
| 2003/0141358 A1 | 7/2003 | Hudson et al. |
| 2004/0054900 A1 | 3/2004 | He |
| 2004/0153344 A1 | 8/2004 | Bui et al. |
| 2004/0172260 A1* | 9/2004 | Junger et al. ............ 705/1 |
| 2004/0195341 A1 | 10/2004 | Lapstun et al. |
| 2006/0175401 A1 | 8/2006 | Roberts |

FOREIGN PATENT DOCUMENTS

| | | |
|---|---|---|
| EP | 0 862 154 | 9/1998 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| JP | 02-139698 | 5/1990 |
| JP | 405178422 A | 7/1993 |
| JP | 405342482 A | 12/1993 |
| JP | 10188141 | 7/1998 |
| JP | 11066176 | 3/1999 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 0 845 749 | 6/1998 |
| WO | 99/33016 | 7/1999 |

OTHER PUBLICATIONS

Information Disclosure Statement filed in U.S. Appl. No. 09/065,552, on Jul. 19, 1999.
Information Disclosure Statement filed in U.S. Appl. No. 08/725,259, on Oct. 5, 1998.
Nintendo Point of Purchase Mail-In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.

John Longwell, "Robec Links Its 18 Sales Facilities Via Newly Adopted NetWare System", Computer Reseller News, Sep. 6, 1993.
Software Maker Promises Many Happy Returns, Drug Topics, Mar. 4, 1996, vol. 140, No. 5, pp. 124-128.
Direct Return 2000, Software Overview, http://www.directreturn.com/software_overview.htm, Oct. 2, 2000.
Amazon.com Returns Policy, Our Return Policy is Simple, Jun. 20, 2000, Amazon.com, www.amazon.com/exec/obidos/subst/help/returns-policy.html, pp. 1-2.
Leyden, "Burgled mum finds stolen iPod on eBay," The Register, May 17, 2005, 1 page.
"Man accused in Lego selling scam," http://www.kptv.com/Global/story.asp?S=4137050&nav=munil56_2, Nov. 18, 2005, 1 page.
Grace, "Reseller Profile—Reynolds and Reynolds; Reynolds goes extra mile— Evolving solutions continue to fuel clients' capabilities", Computer Reseller News, CMP Publications, Inc., Feb. 21, 1994, 2 pages.
PR Newswire, "CompuServe Introduces Electronic Product Registration Software", PR Newswire Association, Inc., Mar. 10, 1994, 2 pages.
Longwell, "Western Digital Wins—Price/performance gives driver maker victory margin", Computer Reseller News, CMP Publications, Inc., Jun. 28, 1993, 3 pages.
Grace, "ABCD Looks to Adopt EDI Transaction Sets", Computer Reseller News, CMP Publications, Inc., Jun. 28, 1993, 2 pages.
Discount Store News, "New Policy System can Par Suspect Returns, Cut Losses", Discount Store News, Lebhar-Friedman Inc., Jan. 1, 1996, 2 pages.
Synchronics® User Manual: Point of Sale, Version 6.5, Apr. 1993 (ON 004464-ON 005116).
Synchronics® User Manual: Inventory Plus, Version 6.5, Apr. 1993 (ON 005117-ON 005892).
Collins, David Jarrett and Nancy Nasuti Whipple, Using Bar Code: Why It's Taking Over, Second Edition (ON 003696-ON 004031).
Birnbaum, Henry, General Information Manual: IBM Circulation Control at Brooklyn College Library, 29pp. (ON 001822-ON 001850.
White, Howard S., Library Technology Reports, Mar.-Apr. 1982, vol. 18, No. 2, pp. 178-184 (ON 001851-ON 001858).
Cooper, Michael D., Design of Library Automation Systems, pp. 83-109 (ON 1859-ON 001873).
Corbin, John, Developing Computer-Based Library Systems, pp. 144-149 (ON 001874-ON 001877).
DataPhase, Inc. Automated Circulation System, 43 pp. (ON 001878-ON 001904).
Dranov, Paula, Automated Library Circulation Systems, 1977-78, pp. 24-47 (ON 001905-ON 001929).
Hoadley, Irene Braden and A. Robert Thorson, An Automated On-Line Circulation System: Evaluation, Development, Use, 1973, 19 pp. (ON 001930-ON 001948).
Meyer, James, "NOTIS: The System and Its Features", Library Hi Tech, Issue 10, vol. 3, No. 2, 1985, pp. 81-89 (ON 001949-ON 001959).
Dowlin, Kenneth E., "Maggie III: The Prototypical Library System", Library Hi Tech, Issue 16, vol. 4, No. 4, Winter 1986, pp. 7-15 (On 001960-ON 001970).
Matthews, Joseph R., "Graphical User Interfaces GUI in Library Products", Library Technology Reports, vol. 32, No. 1, Jan. 1996, p. 53 (ON 001972-ON 001976).
Saffady, William, "Integrated Library Systems for Microcomputers and Mainframes: A Vendor Study", Library Technology Reports, vol. 30, No. 1, Jan. 1994, p. 5 (ON 001977-ON 002087).
Saffady, William, "Vendors of Integrated Library Systems for Minicomputers and Mainframes: an Industry Report, part 1", Library Technology Reports, vol. 33, No. 2, Mar. 1997, p. 161 (ON 002088-ON 002096).
Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).
Salton, Gerard, Dynamic Information and Library Processing, pp. 62-69 (ON 002139-ON 002143).
Grosch, Audrey N., Distributed Computing and the Electronic Library: Micros to Superminis, pp. 78-79 (ON 002144-ON 002146).
Reynolds, Dennis, Library Automation: Issues and Applications, pp. 42-49 and pp. 146-149 (ON 002147-ON 002153).
Salmon, Stephen R., Library Automation Systems, p. 239 (ON 002154-ON 002155).
Synchronics Software Product Information guide, 95 pages.
Direct Return 2000, Software Overview, http://www.directreturn.com/software_overview.htm, Copyright © 2000 Pharmacy Software Solutions, Inc.
"Retailing in Cyberspace", Narda News, Apr. 1995, pp. 21-22.
PR Newswire, "Escada Offers A Garden Variety For Spring", PR Newswire Association, Inc., Mar. 10, 1994, 2 pages.
Automotive News, "Reynolds, ADP differ on superhighway progress", Crain Communications, Inc., Apr. 11, 1994, 3 pages.
Computer Reseller News, "Case Study; Tapping The Channel's 'Best In Class' ", CMP Publications, Inc., Jan. 30, 1995, 2 pages.
Rigney, "User Migrates to Windows NT", InternetWeek, CMP Publications, Inc., Jan. 10, 1994, 2 pages.
Business Wire, "Multimillion-dollar Health-care Products", Business Wire, Inc., Dec. 15, 1993, 2 pages.
Margulis, "Reclaim: an efficient way to handle damaged products", U.S. Distribution Journal, BMT Publications Inc., Mar. 15, 1992, 7 pages.
Jiji Press Ticker Service, "MITI Working Out Business Practice Guidelines", JiJi Press Ltd., Apr. 20, 1990, 1 page.
Jiji Press Ticker Service, "JCCI Issues Booklet To Explain Distribution", JiJi Press Ltd., Jul. 20, 1989, 1 page.
Business Wire, "Aztech Labs Inc. is Chosen as Business Depot's 'Vendor of the Year'; Canadian Company Honors Multimedia Hardware Manufacturer as No. One in Computer Category", Business Wire, Inc., May 6, 1996, 2 pages.
LaPlante, "Rugby Darby; From proprietary host to a distributed LAN-based architecture in 2 years", InfoWorld, InfoWorld Media Group, Nov. 15, 1993, 4 pages.
Witt et al., "Distribution: a differentiator in 2000", Material Handling Engineering, Penton Publishing Inc., Oct. 1995, 15 pages.
Grotta, "Return to vendor: the right way to make mail-order returns", PC Sources, Information Access Company, a Thomson Corporation Company, ASAP Coastal Associates Publishing L.P., Feb. 1992, 10 pages.
Consumer Electronics, Warren Publishing, Inc., Consumer Electronics Personals, vol. 35, No. 6, p. 18.
Business Wire, "DataTrend receives award from AT&T Global Information Solutions", Business Wire, Inc., Nov. 7, 1995, 2 pages.
Quinn, "Why Wang took the third-party route", Information Access Company, a Thomson Corporation Company, ASAP Reed Publishing USA, vol. 30, No. 2, p. 30, Feb. 1991.
Rogers et al., "Going Backwards: Reverse Logistics Trends and Practices", Reverse Logistics Executive Council, 1998 (entire book).
IBM Systems Journal, vol. 14, No. 1, 1975, pp. 1-101.
CollegeTermPapers web page printout, "History of Fed Ex", www.colleoetermpaper...rmPapers/Aviation/history_of_fed_ex.html (Aug. 24, 2001), 7 pages.
Rosenbloom, "Midnight Express", Inc., Jul. 2001, 4 pages.
Sleeper, "FedEx Pushes The Right Buttons to Remain No. 1 In Fast Shipping", Investor's Business Daily, May 25, 2001, 2 pages.
Brewin et al., "Follow That Package!", Computer World, vol. 35, No. 12, Mar. 19, 2001, 4 pages.
Joachim, "FedEx Delivers On CEO's It Vision", InternetWeek, Oct. 25, 1999, 4 pages.
Federal Express Information Packet, 56 pages (incl. cover and table of contents).
Sigafoos et al., "Absolutely Positively Overnight!:The Unofficial Corporate History of Federal Express", St. Luke Press, 1988, pp. 1-22.
Witt, "How to Master The Art of Returns: Automation Is The Key", Material Handling Engineering, Jun. 1994, pp. 58-60.
Dilger, "The Other Direction", Manufacturing Systems, vol. 15, No. 10, pp. 12-13 (Oct. 1997).
"Computer City Moves to Consolidate Returns", Computer Retail Systems, vol. 6, No. 125, Jan. 22, 1998, 2 pages.
Dreamcom web page printout, www.dreamcomdirect.com/RMA.htm (May 25, 1997).

* cited by examiner

VOICE RECOGNITION AND APPARATUS USING MODEL NUMBER LOOKUP

CROSS REFERENCE TO RELATED APPLICATIONS

This application is a national phase of PCT/US01/31589, filed Oct. 10, 2001, which claims priority to U.S. Provisional Application No. 60/238,452, filed Oct. 10, 2000. The entire contents of these applications are incorporated herein by reference

BACKGROUND AND SUMMARY OF THE INVENTION

The present invention relates to voice recognition units or systems (VRUs) for enabling users to remotely obtain information in an efficient and accurate manner from a database using voice commands and/or responses over a telephone system. More particularly, the invention relates to a VRU system that enables users to obtain information regarding return, warranty, replacement and/or repair of previously purchased products from an electronic product registration (ER) system, such as the type disclosed in U.S. Pat. Nos. 5,978,774 and 6,018,719, the disclosures of which are incorporated by reference herein in their entirety.

Electronic registration (ER) systems rely on the use of a unique identifier, such as a serial number, for each product that is purchased. The serial number is obtained at the point of sale for inclusion in a registration database, together with other information, such as a date of transaction. This database can then be accessed in connection with an attempted product return/warranty transaction for the purpose of determining if the product qualifies for return/warranty under applicable return/warranty criteria (which is also stored in or made available to the system). Such electronic systems may also be used in connection with repair and/or exchange transactions, in addition to returns, by enabling an accurate determination as to whether the product qualifies for any of these actions under the appropriate policies and criteria under which the product was originally sold.

The ER system uses pre-established return/repair policies and procedures that are programmed into the system so that the system can perform a check when a product is presented for return to determine if the product qualifies for return, replacement and/or warranty repair based on sales transaction information available in the ER system for the particular product at issue. Thus, known ER systems include a database of return qualification information (or warranty/replacement criteria) for various manufacturer's which enables the system to make an accurate determination with respect to whether or not a particular product or item (that is uniquely identified by the system using a serial number or other unique identifier) actually qualifies for return (or warranty/replacement) based on the appropriate qualification criteria. Such ER systems have greatly reduced improper and fraudulent returns and warranty claims.

ER systems have, in the past, used a unique identifier for each product that is registered, thereby enabling the system to provide return qualification information respect to the particular product being returned. Voice recognition systems for accessing the ER database have also been based on unique identifiers. Thus, in the past, products that do not include a unique identifier associated therewith have not been able to be incorporated into ER systems for access by VRU systems.

Voice recognition systems have been successfully used in the past in connection with electronic registration systems for purchased products for the purpose of enabling users to obtain information about return, warranty, replacement and/or repair of the purchased products. Voice recognition (VRU) systems have been used in the connection with such electronic registration (ER) systems to enable remote access to the registration data that is collected by the ER system. Due to the fact that the ER systems have been based on serialized products (i.e., products each having a unique serial number), the VRU systems used therewith have also been based on the use of serial numbers. An example of a VRU system that uses serial numbers is disclosed in PCT application No. PCT/US01/25296 filed Aug. 14, 2001, and entitled "Voice Recognition Method and Apparatus Using Dynamic Link Library", the disclosure of which is incorporated by reference herein.

While such VRU systems have proven to be very useful in their current forms, additional improvements in such systems are still desired in order to provide additional functionality that will benefit customers, retailers and/or manufacturers. To this end, the instant invention provides an improved VRU system that has increased functionality, by providing an enhancement to known VRU systems that enable information on non-serialized products (i.e., products that do not have a unique identifier) to be accessed by users in a manner that is similar to the serialized VRU systems.

In accordance with the invention, the improved VRU system enables non-serialized data or identifiers to be used to access return/warranty qualification information that applies to a class or group of similar products. For example, in accordance with the invention, model numbers or other non-serialized data (such as UPC or SKU numbers) that do not uniquely identify a particular product can be entered into the VRU system for the purpose of obtaining return and/or warranty information for the product. The invention enables information to be accessed through a VRU on products that may not have been originally intended for electronic registration, due to, for example, their price, nature or other characteristics. The invention also enables products that have already been sold without collecting registration data at the point of sale to be added into the ER system for access by the VRU system.

In accordance with the invention, the VRU system accesses a database that has been previously loaded with information on model numbers (or other non-unique identifiers) and applicable return and/or warranty criteria for products having these model numbers. The database may also contain serialized information so that the VRU system can perform serial number (or other unique identifier) lookup operations and model number (or other non-unique identifier) lookup operations. Thus, the instant invention enables non-serialized products to benefit from electronic registration in substantially the same manner that serialized products have and are currently benefiting from electronic registration. While the non-serialized information does not provide the same level of accuracy as a serialized system, in that specific sales information on a specific product is not available for the non-serialized products, the information is still useful in making logical decisions about whether or not the product qualifies for return or warranty based on information in the system about the entire class or group of products to which the product belongs.

In accordance with one aspect of the invention, a voice response system is provided for use in obtaining return qualification information for a product using a non-unique product identifier. The voice response system includes: a dial-in system operable to prompt a caller for the non-unique product identifier, wherein the non-unique product identifier identifies the product as a member of a defined product group; a product registration database including a plurality of different, non-unique product identifiers; a return policy storage that defines return policies for each of the non-unique product identifiers; and an arrangement that looks up a specific return policy for the non-unique product identifier entered by the caller and provides information to the caller regarding return qualification for the product identified by the non-unique product identifier.

In accordance with another aspect of the invention, a method is provided for operating a voice response system. The method includes: storing different non-unique product identifiers into a system; storing a return policy in the system for each of the non-unique product identifiers, wherein the return policy defines criteria under which products having the non-unique product identifier associated with the policy can be returned; prompting a caller using a dial-in voice system for a non-unique identifier associated with a product for which a return is desired; Looking up the entered non-unique identifier to determine if it corresponds to one of the stored non-unique identifiers in the system; if the non-unique product identifier does correspond to a stored non-unique identifier, obtaining a stored return policy for that non-unique product identifier; and communicating return qualification information based on the stored return policy back to the caller through the voice system.

BRIEF DESCRIPTION OF THE DRAWINGS

The invention will be further understood by review of the following detailed description of the invention when read in conjunction with the appended drawings, in which.

DETAILED DESCRIPTION OF THE DRAWINGS

The preferred embodiment of the instant invention will now be described with reference to the drawings. It is noted that this description of the invention is only exemplary and is not meant to limit the invention beyond the express scope of the appended claims.

Figure 1:
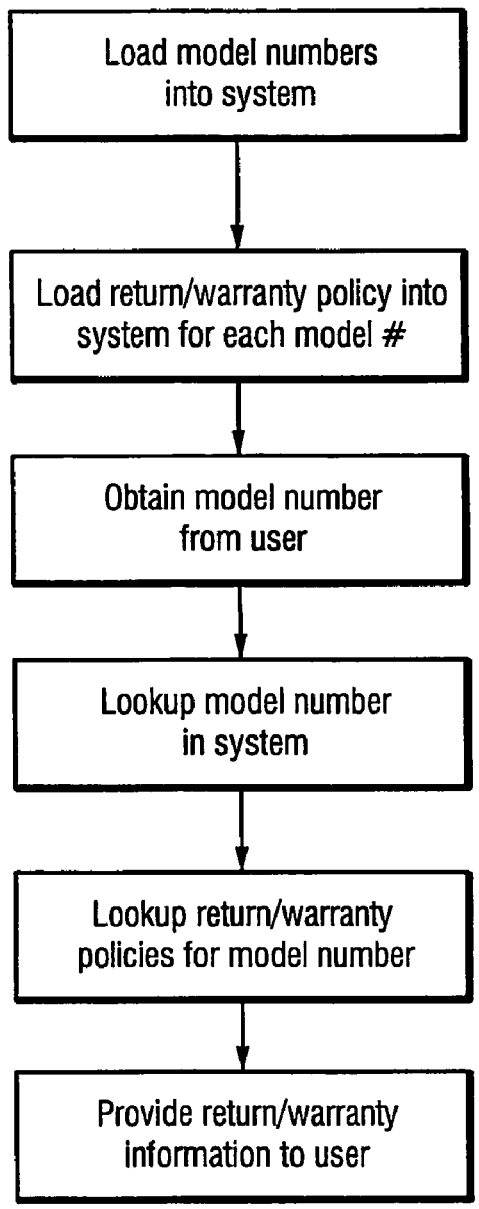
FIG. 1 is an exemplary high-level flow chart of the main features of the VRU system of the instant invention.

FIG. 1 shows a high-level flow chart of the main steps that are performed in accordance with the VRU model number lookup system of the instant invention. In accordance with the invention, non-unique product identifiers, such as product model numbers or the like, are preloaded into a database system, such as, an electronic product registration system. The loaded model numbers define model numbers for which the system will be able to provide return qualification information to a requesting party. Thus, if a manufacturer, retailer or other party desires to utilize the system for the purpose of reducing the number of unauthorized returns, that party provides the models numbers of interest (or other non-unique product identifiers) so that they can be loaded into the system.

The party then also defines a return/warranty policy for each different model number that has been loaded into the system. The policies are preferably based on some information that relates to the sale or shipment of products having the particular model numbers. For example, a policy may state that product having a particular model number cannot be returned X days after the last shipment of such products from the manufacturer to the retailer. Another example of a policy is one that states that products having a certain model number cannot be returned X days after the last sell-through date at the retailer or products having that model number. These are useful policies in reducing unauthorized returns, because they define a time period for return that logically relates to a legitimate return period. For example, if a retailer knows that the last product having a certain model number was sold on a certain date, then the retailer can define a policy that states that no returns are allowed after X days (e.g., 90 days) from that date for products having that model number. Of course, this system may allow some improper returns, due to the fact that there is no way to know exactly when a particular product having the model number was purchased (or shipped). However, the system at least can provide a logical cut-off date for returns based on the last sale (or shipment) date for all products having that model number, thereby still operating to reduce the number of unauthorized returns. In other words, in this example, the system basically assumes that all products having that model number were purchased on the date the last one was purchased (even though this is likely not the case). This enables decisions to be made as to return qualification based on these last dates. Any policy can be used in accordance with the system with a group of products having the same non-unique product identifier depending on the particular desires of each retailer and/or manufacturer.

It is noted that the invention has been described in the context of a VRU system, However, the invention has broader applications and can be used in a computerized look-up system as well as a VRU system. In the computerized system, the user would access the system through a web site or other computer communication and then be prompted for the model number or other non-unique identifier. The computerized system would then look up the associated return/warranty policy for the product and provide return qualification information back to the user through the computer system (rather than through the VRU system).

As explained above, rather than sending a product serial number query to a database, a non-unique identifier, such as a product model number, is accepted by the VRU and is sent to the database. As will be understood by those skilled in the art, a product serial number is unique for each product, whereas more than one product (typically the same type of product) may have a non-unique identifier such as a product model number. While the description of the present invention will hereinafter refer to "model number", those skilled in the art will understand that any non-unique identifier could be sent as at least part of a query to the database in accordance with the instant invention.

In one embodiment of the instant invention, the caller will speak whether a serial number lookup or a model number lookup (or some other type of lookup) should be performed. The VRU will then access the appropriate database based upon that spoken indication from the caller. Alternatively, the VRU system is capable of automatically determining whether a spoken or keyed query provided by the caller is a product serial number query or a product model number query (or other type of informational query) just from the number itself and automatically accesses the appropriate database based upon that determination.

If a serial number lookup query is requested by the caller, serial number registration information is retrieved from the system, as described, for example, in the above-referenced PCT application. The VRU then converts the information so that it is sent back to the caller. On the other hand, if a product model number query is requested by the caller, then policy information relating to products having that model number can be retrieved from the system. The VRU can then convert this policy information so that it can be read back to the caller through the VRU system. The VRU system of one embodiment of the instant invention enables users to obtain information regarding return, warranty, replacement and/or repair of previously purchased products using product model number information and without any type of information (e.g., serial number, purchase date/time and/or individual transaction information) being obtained at the time the product is purchased.

By using a model number lookup rather than a serial number lookup, a retailer can effectively control the return, warranty, replacement and/or repair of purchased products even if the retailer did not collect any information at the time the products were purchased, or even have the ability of (or even contemplated) providing such control at the time the products were purchased, since no information at the point of sale is needed. Moreover, no information regarding the individual purchase transactions, particular purchase dates/times and/or serial numbers is needed to provide model number lookup in accordance with the instant invention. Instead, policy or criteria information is needed that relates to the entire class or group of products that are covered by the model number or other non-unique identifier. For example, a policy may be defined for a particular product model number such that any purchased product having that model number cannot be returned X number of days after the last ship date from the manufacturer to the retailer of products having that model number. This exemplary return policy can be instituted by the retailer and/or manufacturer without collecting any information at the time of sale and can thus be instituted after some or all of the sales of the products having that particular model number are completed. As long as the return policy for that particular model number has been defined before the caller provides the model number query to the database, the only additional information needed is) the model number itself from the caller. Serial number, purchase date/time and/or other transactional data at the time of sale (or any time thereafter) is not required.

A VRU system using a model number lookup can operate at a lower cost since a registration system for obtaining information at the time of sale or any time thereafter is not needed. In addition, the products do not have to be assigned unique identifiers. Thus, a system which registers serial number, purchase date/time and/or other transactional information is not necessarily needed in order for the VRU system of the instant invention to operate effectively to reduce the number of improper or fraudulent returns and/or warranty repair or replacement. Moreover, less storage space for model number data and policy information is typically needed than for a time-of-sale registration system (e.g., a serial number registration system).

Figure 2:
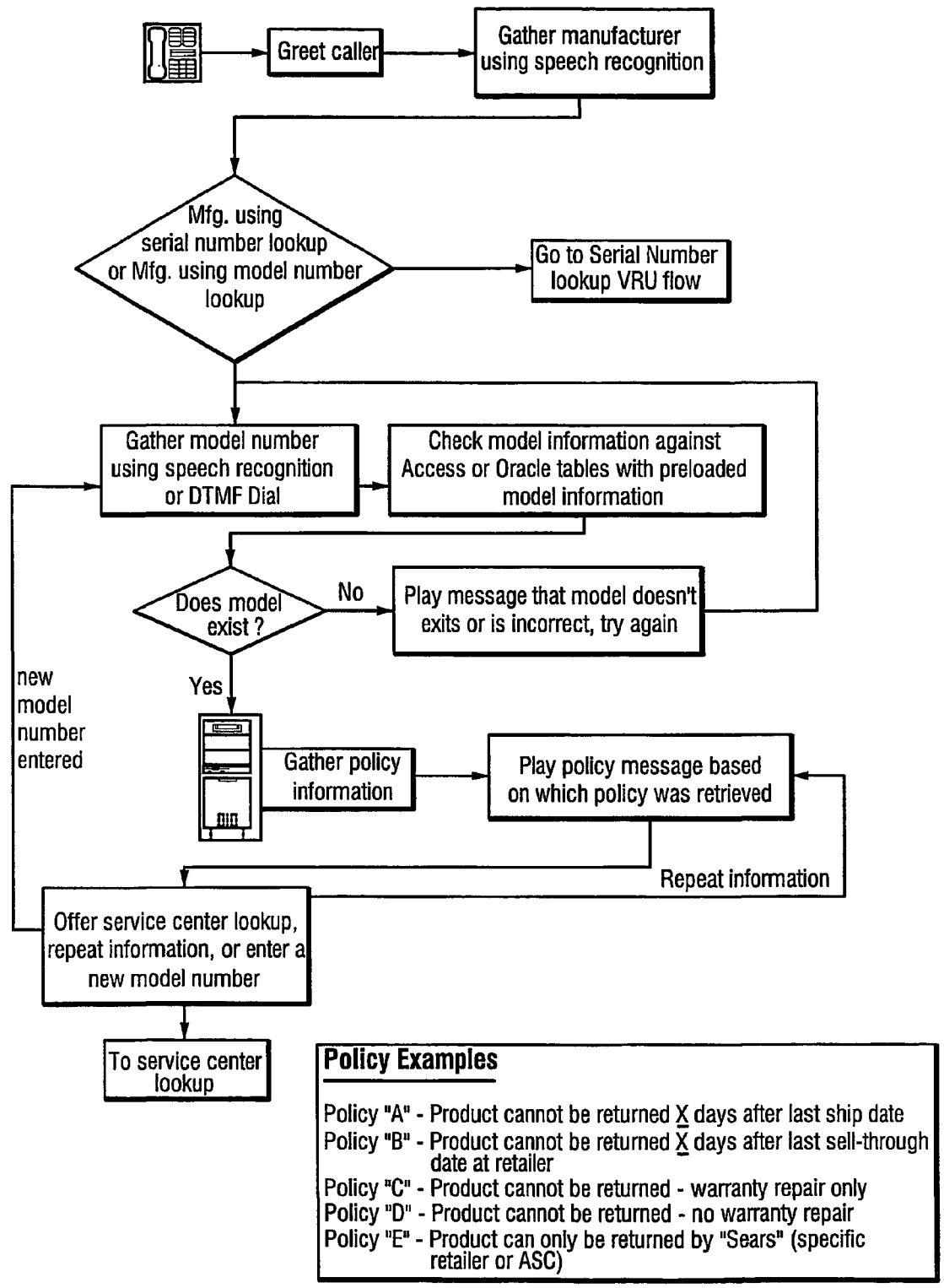
FIG. 2 is an exemplary overall block diagram illustrating the operation of the instant VRU system in accordance with a preferred embodiment of the instant invention.

Referring now to FIG. 2, when a call accesses the VRU system of the present invention, the caller is greeted with a welcome message. The VRU prompts the caller for initial information, such as a manufacturer of a purchased product. This is preferably a speech recognition step and can recognize several manufacturers and product types associated with those manufacturers. If the manufacturer spoken by the caller is a registered client of the VRU system (such as a SiRAS client), the VRU prompts the caller to speak whether a serial number lookup or a model number lookup is to be performed. Alternatively, the VRU system is capable of automatically determining whether a spoken or keyed number provided by the caller is a serial number or a model number (or other type of information) just from the number itself.

If the caller speaks that a serial number lookup is to be performed (or alternatively, if the VRU automatically determines that the number spoken or keyed by the caller is a serial number), that information is sent to, for example, an Oracle® table to query. After retrieving the serial number information, the system returns all of the applicable return and/or warranty dates that have been defined in the system. The VRU converts all of the information into sentences, which are then played back to the caller. This whole process preferably takes about 3-5 seconds to complete. The VRU will then ask the caller if they want the information repeated or give options to lookup a service center (based on the specific product they looked up), get the 800# for the manufacturer, or try another serial number. Additionally, the VRU could also ask the caller if he/she wants to enter a new serial number or a model number. Inasmuch as the instant invention is primarily directed to non-serialized (e.g., model number) lookup, additional details about the serial number lookup features are omitted and can be further understood from review of the above-referenced U.S. patents and PCT application.

If the caller speaks that a model number lookup is to be performed (or alternatively, if the VRU automatically determines that the number spoken or keyed by the caller is a model number), the VRU can send a query to a Microsoft Access® or an Oracle® data table which stores preloaded model information. If the model number information of the query sent to the data table fails to correspond to (e.g., fails to match) any of the preloaded model numbers in the data table, the VRU plays an error message that the model number doesn't exist or is incorrect and asks for a new model number to be provided by the caller. If the model number information of the query sent to the data table does correspond to a pre-loaded model number in the data table, the VRU retrieves the pre-loaded policy information (e.g., return, warranty, replacement and/or repair information) associated with that particular model number from the data table or other suitable database. The VRU converts the policy information associated with the selected model number into sentences, which is then played back to the caller. The VRU will then ask the caller if he/she wants the policy information repeated, and gives an option to lookup a service center (based on the specific product he/she looked up), obtain the telephone number of the manufacturer, or try another model number. Additionally, the VRU can also ask the caller if he/she wants to enter a serial number to thereby initiate a serial number lookup as described above. After completing either the serial number lookup or the model number lookup, if the caller chooses to lookup a service center, the VRU prompts the caller to speak or key in their zip code to obtain the three (or other number of) closest service centers for the identified product. After the service center information is complete, the caller can repeat the information, try another zip code, or start over with another serial number. Additionally, the caller could start over with a model number.

As explained above, when someone calls the VRU, the caller is greeted and prompted for the manufacturer. After the caller speaks the manufacturer, the caller is prompted to speak whether a serial number lookup or a model number lookup is requested. In accordance with an alternative embodiment of the instant invention, a number can be spoken or keyed (i.e., dialed) by the caller and the VRU will automatically determine whether the number is a serial number or a model number. If the caller requests that a serial number lookup is to be performed, the VRU performs a serial number lookup. If, however, the caller requests that a model number lookup is to be performed, the VRU performs a model number lookup.

To perform a model number lookup, information relating to the model number from the caller is sent as a query to a Microsoft Access® or Oracle® data table (or any other suitable data table) which stores preloaded model information. As will understood by those skilled in the art, "preloaded" model information is stored at any time before the query is sent by the caller to the data table. The model number information from the caller is compared with the preloaded model information stored by the data table to see if the model number exists in the data table. If model number information from the caller does not correspond to (e.g., match with) one of the preloaded model numbers of the data table, an error message will be played indicating that the model number from the caller does not exist or is incorrect. The VRU will then prompt the caller to re-speak the model number. If the model number information originally provided by the caller does correspond to one of the preloaded model numbers, the VRU will select and retrieve policy information which is associated with that particular model number from the data table. The VRU will convert this retrieved information and play to the caller a policy information message that explains the return/warranty repair options that may be available to the caller. Alternatively, the policy information may be stored in a preloaded database different than the Microsoft Access® or Oracle® data table which stores the model number information.

The policy information can be defined by the retailer and/or manufacturer for each model number. Different retailers can thus have different policies for the same model number. A non-exhaustive list of examples of the policies includes the following:

Policy A—Purchased product cannot be returned X days (e.g., 90 days) after the last ship date for products having the model number (e.g., the last date products were shipped from the manufacturer to the retailer having that model number).

Policy B—Purchased product cannot be returned X days after the last sell-through date at the retailer of products having that model number. The last sell-through data can be determined, for example, through inventory records for the retailer.

Policy C—Purchased product cannot be returned. Only warranty repair is available.

Policy D—Purchased product cannot be returned. No warranty repair.

Policy E—Purchased product can be returned only by a specific retailer(s) or authorized service center(s). Returns by other retailers or non-authorized service centers are not permitted.

After a policy message is complete, the caller can repeat the playing of the policy message, initiate a service center lookup as described below, or enter a new model. In accordance with a further embodiment of the instant invention, a new serial number can also be entered to thus begin a serial number lookup as described above.

When a model number is requested by a caller, a counter may be activated to count the total number of times a specific model is requested. This count can be stored in a database and further increased for each model number as they are respectively requested. This count may, for example, provide an indication that a specific product model is being returned often by customers.

The voice recognition system of the instant invention may use a method known as "screen scraping" in order to obtain the desired data for use in the VRU process. Such screen scraping methods rely on a computer screen (such as an AS/400 screen) to display information. The VRU will send the query (such as a product serial number query) to the AS/400 screen and the VRU will copy the return information it sees on the screen. This information is converted and the appropriate information (such as date information relating to a previously purchased product) are read back to the caller. Screen scraping is not always a reliable way to retrieve data because if any screen on the AS/400 is modified and/or fields are moved around, the VRU system needs to be retrained to know what the screens look like and what parts need to be scraped (i.e., what fields contain the desired data). Thus, the preferred embodiment of the instant VRU system uses a custom dynamic link library (DLL) instead of screen scraping in order to improve the operation of the VRU system. By using a custom DLL, things can change in the background and these changes are seamless to the VRU. In other words, the VRU system of the instant invention preferably does not use an AS/400 screen or other computer screen. Instead, the product model number query (or other information query) is sent via a customized DLL to a database servlet application using, for example, HTTP protocol. In the preferred embodiment, the application accesses a specified host system such as an Oracle database and retrieves the model number registration information. The servlet returns the model number registration information (or other desired information) back to the DLL, which in turn returns it back to the VRU. The VRU converts the information and the appropriate dates relating to the model number (or other non-unique identifier) are read back to the caller. The preferred customized DLL embodiment of the instant invention is described in further detail below.

Figure 3:
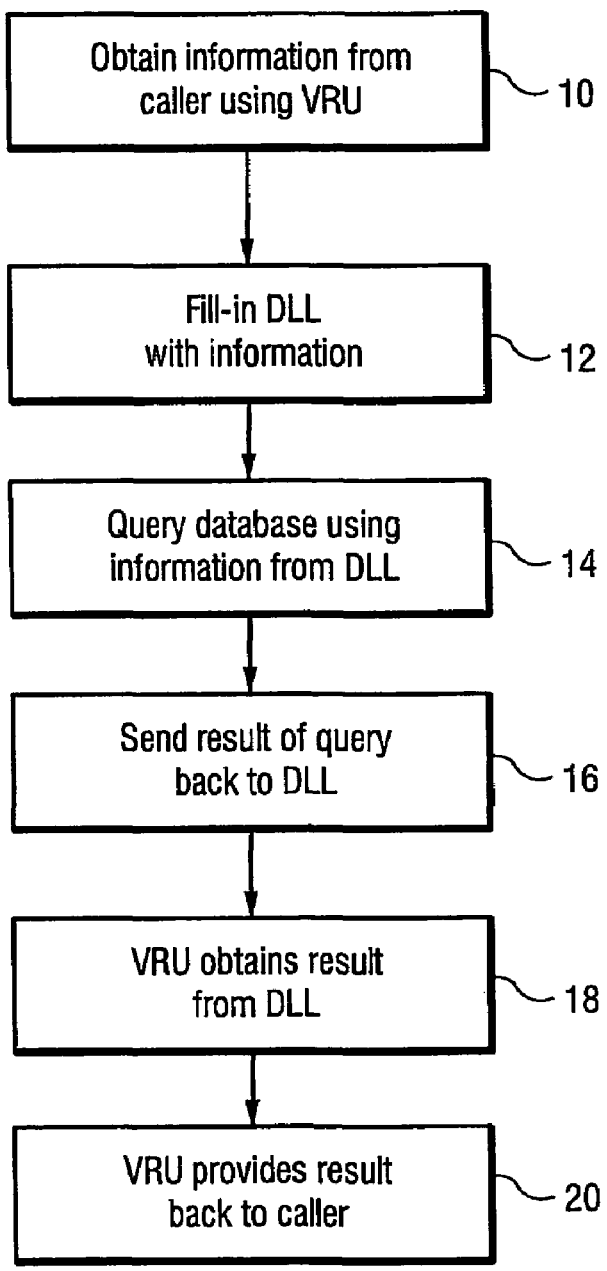
FIG. 3 is an exemplary high-level flow chart illustrating the operation of the instant VRU system.

Referring now to FIG. 3, the high-level flow of the VRU system of the instant invention includes a first step 10 of greeting a caller who calls the VRU system. In this step, the VRU uses voice prompts to prompt the user to enter information through the telephone or other communication device needed in connection with the particular application in which the VRU system is employed. For example, when used in an Electronic Product Registration (ER) system, such as described in the above-referenced patents, the VRU prompts the user to enter information regarding the product that the user is calling about, such as the product model number and manufacturer. The VRU includes a predefined object for each of the pieces of information that is requested by the VRU. The VRU then passes the information to a customized Dynamic Link Library (DLL) (Step 12). The DLL includes predefined fields corresponding to the objects in the VRU. The DLL also includes additional fields to be loaded with information from the database to be passed back to the caller, as will be described in greater detail below.

Once the DLL has data passed to it by the VRU, a database application program uses the information in the DLL to formulate a query to a database, such as an Oracle® database or the like. The database is then queried (Step 14) to obtain information therefrom corresponding in some way to the information provided by the caller. The result of the query is then passed back to the DLL (Step 16) and is loaded into predefined fields in the DLL. The VRU then obtains the resulting information from the DLL and loads the information into corresponding objects in the VRU (Step 18). The VRU then provides the information back to the waiting caller, thereby providing the caller with the information that was requested (Step 20).

Figure 4:
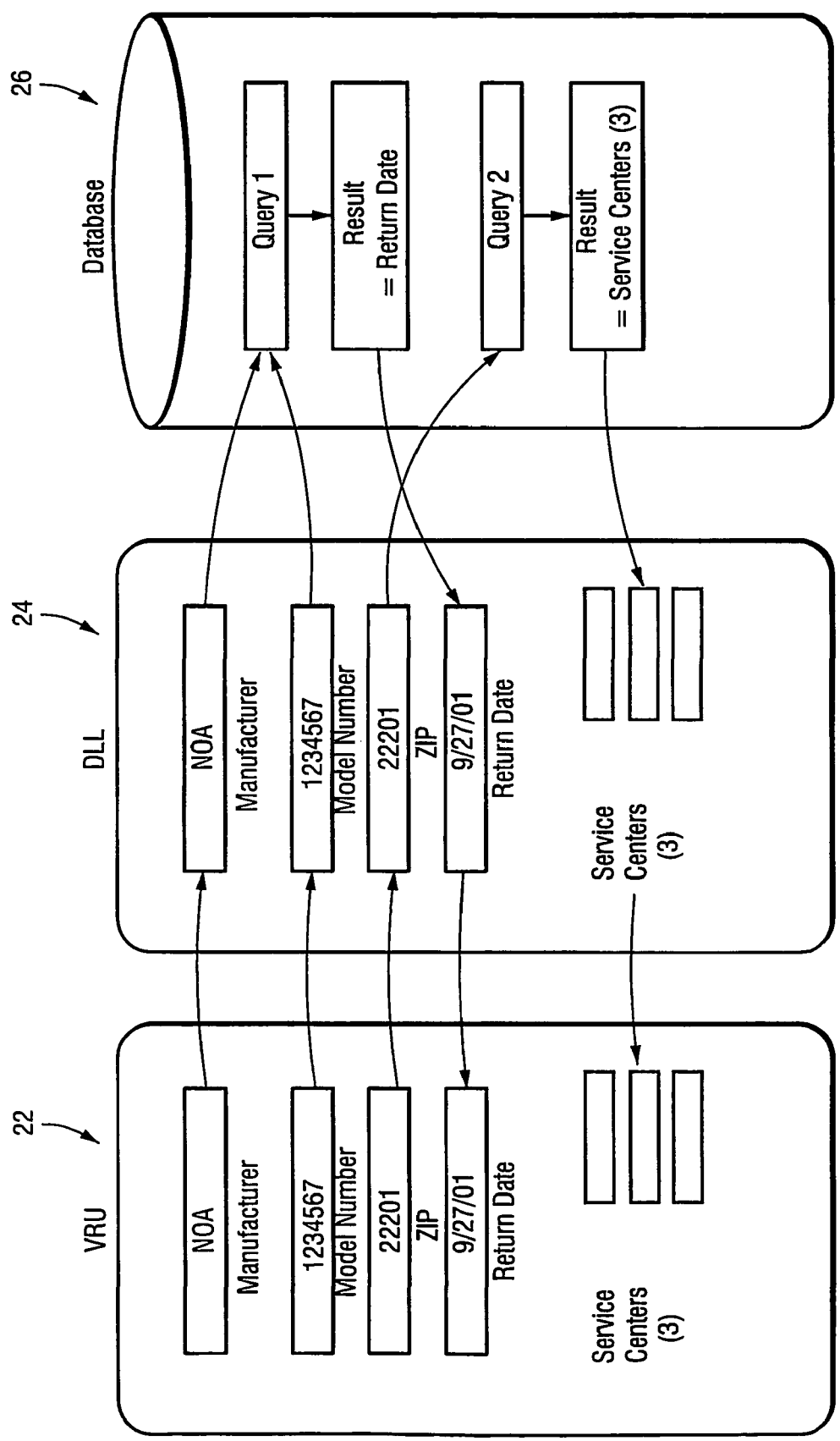
FIG. 4 is a schematic diagram of the interaction between the VRU, DLL and database in accordance with a preferred embodiment of the instant invention.

FIG. 4 shows the interaction between the VRU 22, DLL 24 and database 26 during an exemplary call from a user of the VRU system. In this example, the VRU system is designed to work in conjunction with an ER system, wherein the caller requests return or warranty information on a previously purchased non-serialized product. As seen in FIG. 4, in this embodiment the VRU includes objects for Manufacturer, Model No. and Zip Code. Thus, this is the information that is requested from the caller by the VRU. The DLL 24 includes predefined fields that correspond to these three VRU objects. Thus, the object data from the VRU is loaded directly into the predefined fields in the DLL. In this example, the Manufacturer and Model No. are used by the database application program to formulate a first query to the database. In this example, the result of this first query is the last date for return and/or warranty repair for the product identified by the entered model number. The database includes a product registration database that is established by importing the model numbers and the associated return/warranty criteria or policies with respect to each of the model numbers.

The result of the first database query is loaded into a corresponding field of the DLL (e.g., Return Date field). The VRU 22 then obtains the return date information from the DLL and stores it as a predefined return date object. The VRU then uses the date object to provide a voice response back to the caller to communicate the date information back to the caller. In this manner, the VRU system of this example enables the caller to enter product information and get return date information back from the system, thereby informing the user whether or not the product qualifies for return and/or warranty repair.

In the example of FIG. 4, the caller is given the option of obtaining information on service centers for the product by entering zip code information when prompted by the VRU. As with the Manufacturer and Model No. information, the Zip information is passed to the DLL and is then used by the database application program to formulate a second query to the database. The second query uses the zip code information to obtain information on the three closest service centers for the product. This service center information is then passed back to the DLL and finally to the VRU in order to provide the service center information to the caller. This information is useful to the caller when, for example, the product no longer qualifies for return under qualification guidelines from the ER database.

Figure 5:
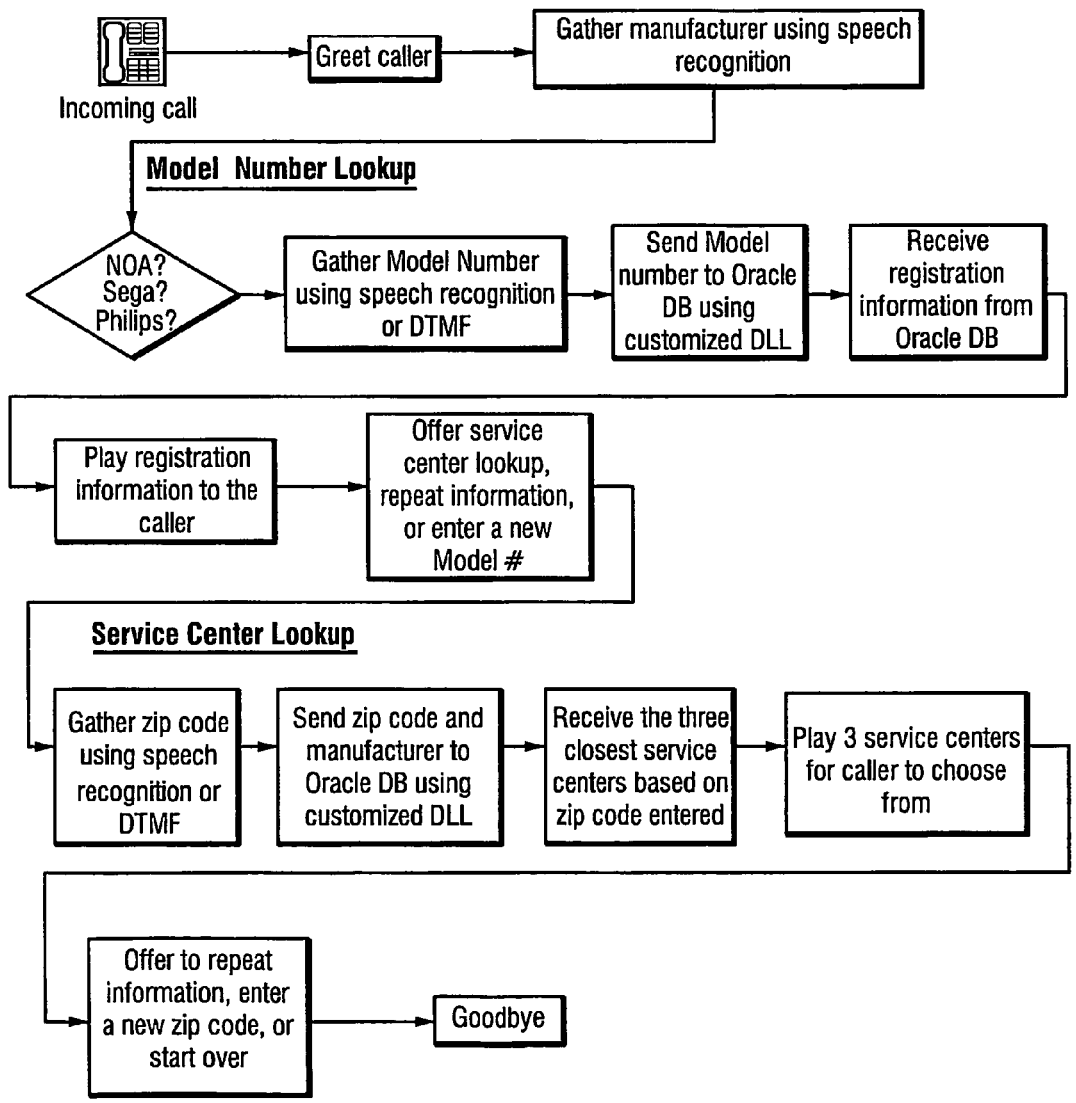
FIG. 5 is a more detailed flow-chart illustrating a preferred embodiment of the operation of the instant VRU system.

FIG. 5 shows an overall flow chart of the exemplary VRU system of the instant invention and as described above in connection with FIGS. 1 and 2. As shown in FIG. 5, when a call comes in to the VRU, the caller is greeted with the welcome message. The VRU then prompts the caller for initial information, such as the manufacturer of a purchased product. This step is preferably a speech recognition step and can recognize several manufacturers and product types associated with those manufacturers (i.e., NOA, SEGA, PHILIPS). If the manufacturer spoken is a registered client of the product registration system, the VRU prompts the caller to speak or key in the model number of the product. After the caller provides the model number, the custom DLL 24 takes that information and sends it via, for example, HTTP to a servlet, which in turn sends it to the Oracle table to query. After retrieving the model number information, the DLL returns with the return and/or warranty dates. The VRU converts all of the DLL information into sentences, which is then played back to the caller. This whole process preferably takes about 3-5 seconds to complete. The VRU will then ask the caller if they want the information repeated or give options to lookup a service center (based on the product they looked up), get the 800# for the manufacturer, or try another model number (or serial number if the system also supports serialized product registrations). If the caller chooses to lookup a service center, the VRU prompts the caller to speak or key in their zip code. Using another custom DLL, the VRU sends the product information and zip code to the servlet. The servlet works with an application, which assigns latitude and longitude and then provides the three closest locations to the zip code provided. The three closest service centers are sent back to the VRU and the VRU assigns the appropriate voice files to play according to the information given back by the DLL. This process preferably takes about 3-5 seconds to complete. The results are then played back to the caller asking which service center they would like information on. After the service center information is complete, the caller can repeat the information, try another zip code, or start over with another model number.

Any known and suitable type of voice recognition system may be used to interact with the caller, and the details of such systems are well-known. Thus, additional details regarding the specific operation of the VRU itself are not provided herein.

As can be seen from the example above, the customized DLL acts as an interface between the VRU and the registration database. As can be seen in FIG. 5, the preferred embodiment includes a model number lookup portion and a service center lookup portion. Further details on the DLL are provided below with respect to each of these portions of this embodiment.

In accordance with the model number lookup portion, when someone calls the VRU, the caller is prompted for the manufacturer of the product. This step is only optional in this embodiment. Depending on the desires of the designer of the system, the manufacturing information could be omitted, as this information may be obtained directly from the serial number. After the caller speaks the manufacturer, the caller is prompted for the model number. The caller speaks the model number into the VRU. The VRU then loads the model number and the manufacturer into the DLL. The DLL is sent to an application server and the information is given to a servlet. The servlet gathers the registration information and then loads the DILL with all of the registration related dates and information. The DLL returns to the VRU and the VRU converts the dates and information and then reads back the information to the caller. This completes the model number lookup portion of this embodiment.

In accordance with the service center lookup, after a model number lookup is finished, the caller can choose to speak in their zip code to lookup the closest service center for that specific product. After a zip code is spoken, the DLL loads the zip code and the model number (given by the first DLL). The DLL is sent to an application server and the information is given to a servlet. The servlet gathers the 3 closest service centers and loads them into the DLL. The DLL returns to the VRU and the VRU reads back the 3 locations that were provided by the DLL. This completes the service center lookup portion.

It is noted that a single customized DLL may be used or a plurality of customized DLLs may be used to implement the invention. In the less complex applications, such as described above, a single DLL can be used for both the model number lookup portion and the service center lookup portion. It is further noted that the ER system application of the invention described above is only one example as to how the instant invention can be implemented. In accordance with the invention, the customized DLL can be used in connection with any suitable voice recognition and response system to improve the overall operation thereof.

Figure 6:
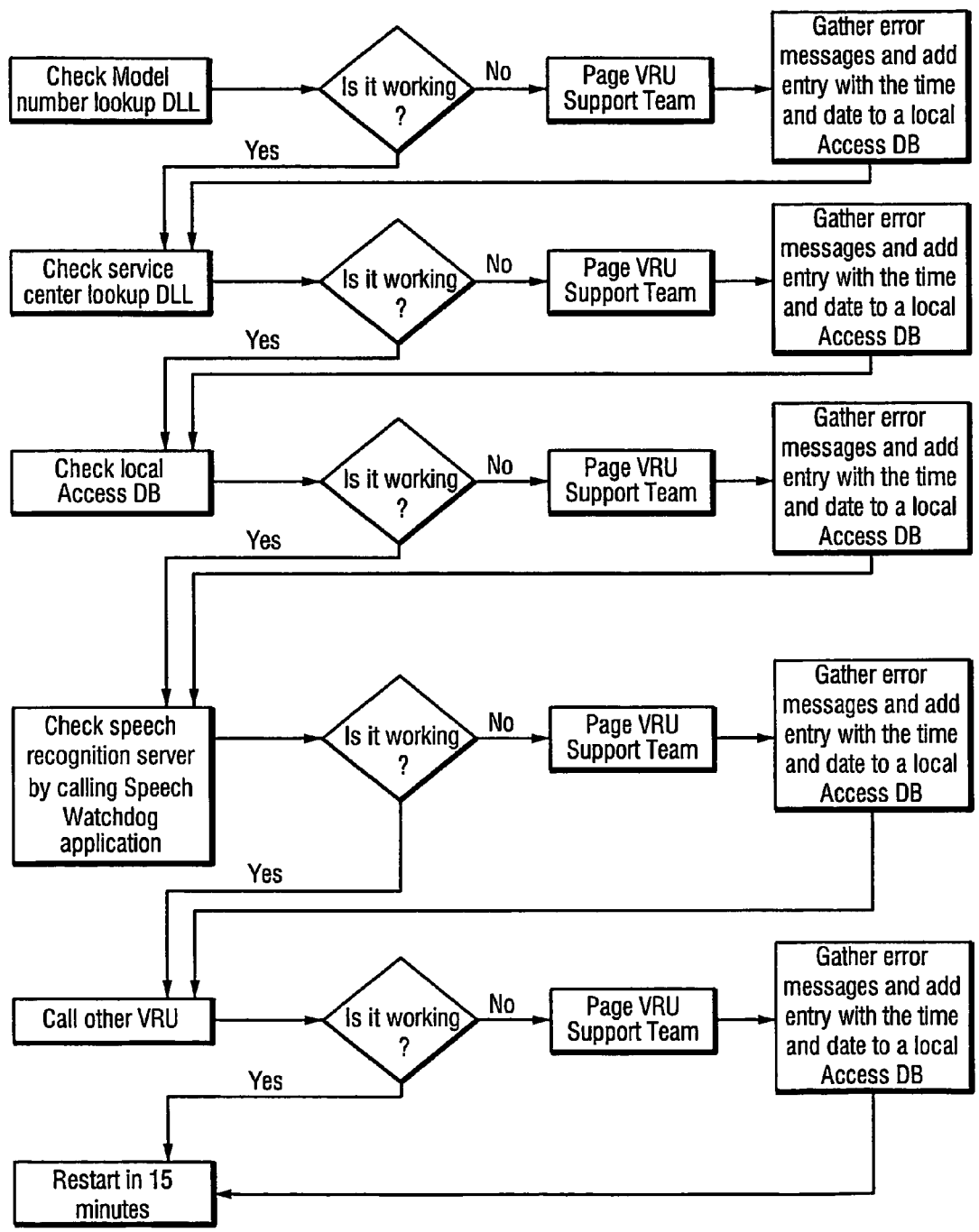
FIG. 6 is an exemplary block diagram illustrating the VRU watchdog feature of the instant invention.
Figure 7:
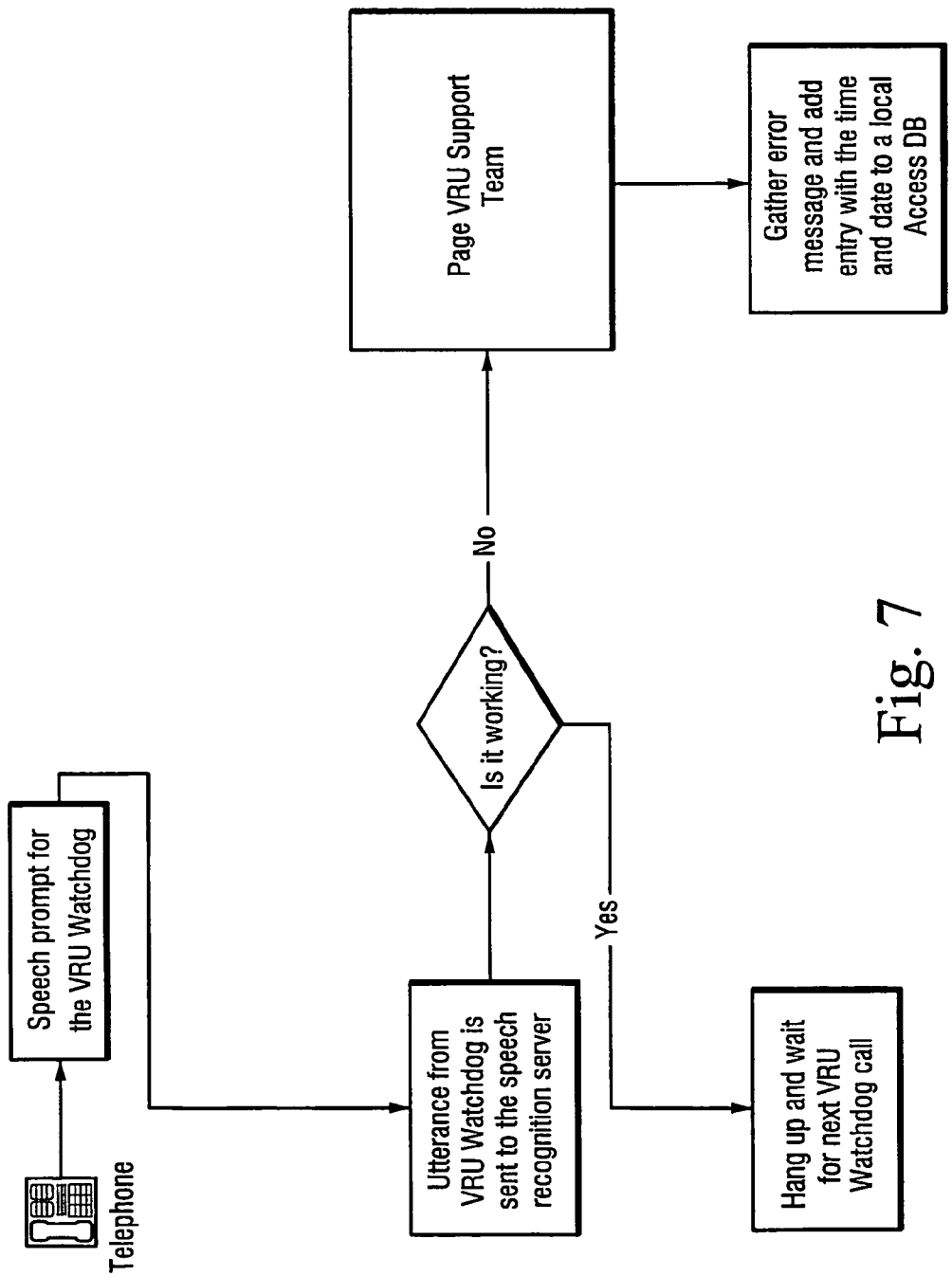
FIG. 7 is an exemplary block diagram of the speech watchdog feature of the instant invention.

In many VRU systems, it is important to assure that the system is operating properly by performing periodic tests of certain aspects of the VRU system. FIGS. 6 and 7 show exemplary processes for testing the operation of the system. FIG. 6 shows a VRU watchdog process that can be used in accordance with the instant invention to check the overall operation of the VRU system. FIG. 7 shows a speech watchdog process that can be used in connection with the VRU watchdog of FIG. 6 to check the speech recognition server of the VRU system is operating properly. Each of these watchdog processes of FIGS. 6 and 7 will be explained in greater detail below.

Referring now to FIG. 6, the VRU watchdog process is used to check various parts of the system, including the model number lookup DLL, the service center lookup DLL, local access to the database, the speech recognition server, as well as any other VRUs running in parallel to support sufficient traffic through the VRU system. As can be seen in FIG. 6, a first check is made to determine if the model number lookup DLL is functional. If not, the system automatically pages or otherwise contacts the appropriate support personnel for the VRU system. If the model number DLL is functional, then the system checks to see if the service center lookup DLL is functional. If not, the system automatically pages the appropriate support person. If the service center DLL is functional, the system checks to see if the local access to the database is operating. If not, the system automatically contacts the support person. If the local access is fine, the system checks the speech recognition server by calling the watchdog application of FIG. 7, which will be described in detail below in connection with FIG. 7. If the speech server is not operating properly, the support person is contacted. Finally, any other VRU systems operating in parallel to support the anticipated traffic to the VRU system is checked in the same manner as described above. Any errors that are found are logged by the system with a time and date stamp in a local access database.

The VRU watchdog is preferably designed to run every 15 minutes and checks all of the DLL's, local databases, speech recognition server, and the other VRU(s), if any. In the preferred embodiment, there are at least two VRU's that have these watchdogs running. If there is a failure in any section of the testing, the VRU will page the VRU support team with the specific error that was encountered. The system will also create a log entry on the local database with the exact error, the date, and the time the error was encountered. Further details on the particular operation of this VRU watchdog are provided below.

As indicated above, the system checks all DLL's by sending a request to the servlet (to simulate a consumer calling on a specific model number) and the watchdog expects specific data to come back. If the data is not accurate or the DLL didn't send anything at all, the system sends out the page and creates the error log entry for the failed DLL. The watchdog then checks the local database by doing a quick query. If the database connection is not there, the system sends out the page to the support group. The next check for the watchdog is the speech recognition server. The watchdog places a call to the Speech Watchdog of FIG. 7 and speaks a sentence that has a high confidence. If the speech server is down, the speech watchdog handles the paging to the support group. The final check for the watchdog is calling any other VRUs running in parallel to the first VRU system. The watchdog places the call and if the other VRU doesn't answer it will page the support team and create an entry in the error log. After the checks are completed, the watchdog resets itself and waits 15 minutes and launches again. The watchdog process preferably only takes about 10 seconds to complete.

The specific operation of the speech watchdog will now be described in connection with FIG. 7. The speech watchdog waits for the VRU watchdog to call and then verifies the speech recognition server is up by recognizing prerecorded message that is guaranteed to be a certain confidence within the VRU system. In other words, the speech watchdog waits for the VRU Watchdog to call it. After receiving the call, the speech watchdog prompts for some speech. After the VRU watchdog speaks, the utterance is sent to the speech recognition server. If the speech wasn't recognized, the speech watchdog sends out a page to the support team and logs the error that the speech server is down. The speech watchdog then hangs up and waits for the watchdog to call back.

While the preferred forms and embodiment of the instant invention have been illustrated and described, it will be apparent to those of ordinary skill in the art that various modification and/or changes may be made to the exemplary embodiment described above. Thus, the exemplary embodiment described above is not meant to limit the scope of the invention beyond the express scope of the appended claims.

What is claimed is:

1. A voice response system for use in obtaining return qualification information for a product using a non-unique product identifier, the voice response system comprising: a dial-in system operable to prompt a caller for the non-unique product identifier, wherein the non-unique product identifier identifies the product as a member of a defined product group; a product registration database including a plurality of different, non-unique product identifiers; a return policy storage that defines return policies for each of the non-unique product identifiers, one or more of said return policies being at least partially dependent on a last date associated with at least one of the products identified by the non-unique product identifier; and an arrangement that looks up a specific return policy for the non-unique product identifier entered by the caller and provides information to the caller regarding return qualification for the product identified by the non-unique product identifier, wherein the system is configured to make a return qualification of a first product having a non-unique identifier based at least in part on a last date associated with a second product having the same non-unique identifier, wherein the last date associated with the second product is a last ship date from a manufacturer to a retailer or a last sell-through date at a retailer.

2. The voice response system of claim 1, wherein the non-unique product identifier is a product model number.

3. The voice response system of claim 1, wherein the non-unique product identifier is a Universal Product Code (UPC).

4. The voice response system of claim 1, wherein the non-unique identifier is a Stock Keeping Unit (SKU).

5. The voice response system of claim 1, further including a watchdog process that periodically tests the operation of the system.

6. The voice response system of claim 1, wherein the database includes return qualification information for purchased products.

7. The voice response system of claim 1, wherein the first product is different from the second product.

8. A method of operating a voice response system, comprising: storing different non-unique product identifiers into a system; storing a return policy in the system for each of the non-unique product identifiers, wherein the return policy defines criteria under which products having the non-unique product identifier associated with the policy can be returned, one or more of the return policies being at least partially dependent on at least a last date associated with at least one of the products having the non-unique product identifier;

prompting a caller, using a dial-in voice system for a non-unique identifier associated with a product for which a return is desired;

determining, via the system, whether the entered non-unique product identifier corresponds to one of the stored non-unique product identifiers in the system;

obtaining a stored return policy for the non-unique product identifier based on the determination that the entered non-unique product identifier corresponds to one of the stored non-unique product identifiers in the system, wherein the system is configured to qualify a first product having a non-unique identifier for return based at least in part on a last date associated with a second product having the same non-unique identifier, wherein the last date associated with the second product is a last shin date from a manufacturer to a retailer, or a last sell-through date at a retailer; and communicating return qualification information based on the stored return policy back to the caller through the voice system.

9. The method of claim 8, wherein the voice system prompts the user for a product model number as the non-unique product identifier.

10. The method of claim 9, wherein the system is a product registration database.

11. The method of claim 8, further including using a watchdog process that periodically tests the operation of the system.

12. The method of claim 8, wherein the first product is different from the second product.

* * * * *